(12) United States Patent
Cutler et al.

(10) Patent No.: US 9,102,412 B2
(45) Date of Patent: Aug. 11, 2015

(54) BRAKING APPARATUS AND METHOD FOR AN AERIAL REFUELING BOOM SYSTEM

(75) Inventors: Lance A. Cutler, Maize, KS (US); Forrest Richardson, Wichita, KS (US)

(73) Assignee: The Boeing Company, Chicago, IL (US)

( * ) Notice: Subject to any disclaimer, the term of this patent is extended or adjusted under 35 U.S.C. 154(b) by 752 days.

(21) Appl. No.: 12/855,284

(22) Filed: Aug. 12, 2010

(65) Prior Publication Data
US 2012/0037757 A1    Feb. 16, 2012

(51) Int. Cl.
B64D 39/02    (2006.01)
B64D 39/04    (2006.01)

(52) U.S. Cl.
CPC ................ *B64D 39/02* (2013.01); *B64D 39/04* (2013.01)

(58) Field of Classification Search
CPC ......... B64D 39/02; B64D 39/00; B64D 39/04
USPC .................. 244/135 A, 135 R; 414/689, 690; 482/54, 118
See application file for complete search history.

(56) References Cited

U.S. PATENT DOCUMENTS

| | | | | |
|---|---|---|---|---|
| 2,475,963 | A * | 7/1949 | Howell | 212/288 |
| 2,639,107 | A * | 5/1953 | Owen | 244/3 |
| 2,663,523 | A * | 12/1953 | Leisy | 244/135 A |
| 2,949,265 | A | 8/1960 | Person | |
| 2,973,163 | A * | 2/1961 | Goodliffe et al. | 244/3 |
| 3,184,084 | A * | 5/1965 | Hellander | 414/689 |
| 4,072,283 | A * | 2/1978 | Weiland | 244/135 A |
| 4,129,270 | A * | 12/1978 | Robinson et al. | 244/135 A |
| H297 | H | 7/1987 | Schultz | |
| 5,573,206 | A * | 11/1996 | Ward | 244/135 A |
| 6,604,711 | B1 * | 8/2003 | Stevens et al. | 244/135 A |
| 6,966,525 | B1 * | 11/2005 | Schroeder | 244/135 A |
| 7,137,598 | B2 * | 11/2006 | Von Thal | 244/135 A |
| 7,152,828 | B1 * | 12/2006 | Garcia et al. | 244/135 A |

(Continued)

FOREIGN PATENT DOCUMENTS

| | | |
|---|---|---|
| EP | 1 361 156 A1 | 11/2003 |
| FR | 2 569 652 A1 | 3/1986 |

OTHER PUBLICATIONS

Wikipedia, the free encyclopedia; "Dead man's switch"; [Retrieved on Aug. 17, 2010]; Retrieved from the Internet ; <URL: http://en.wikipedia.org/w/index.php?title=Dead_man%27s_switch&oldid+377466503>; pp. 1-5.

(Continued)

*Primary Examiner* — Valentina Xavier
(74) *Attorney, Agent, or Firm* — Alston & Bird LLP

(57) ABSTRACT

A braking apparatus of an aerial refueling boom system is provided to reduce the likelihood of or to prevent anomalous boom extension. The braking apparatus includes a pulley about which a cable wraps. The pulley is configured to be operably mounted to a first tube of the boom system and to rotate in response to movement of a second tube relative to the first tube as a result of the connection of the cable to the second tube. The braking apparatus also includes a lock, such as a brake or a pin lock, having open and actuated positions. In the actuated position, rotation of the pulley and movement of the second tube relative to the first tube are prevented. The lock is configured to be actuated by a reduction in performance of an actuation source that otherwise controls the relative positions of the first and second tubes.

6 Claims, 10 Drawing Sheets

(56) References Cited

U.S. PATENT DOCUMENTS

| | | |
|---|---|---|
| 7,637,458 B2 | 12/2009 | Near et al. |
| 7,837,151 B1 * | 11/2010 | Garcia, Jr. ................. 244/135 A |
| 7,900,866 B2 * | 3/2011 | Kutzmann et al. .......... 244/1 TD |
| 8,231,083 B2 * | 7/2012 | Kutzmann et al. ......... 244/137.4 |
| 2004/0204294 A2 * | 10/2004 | Wilkinson et al. .............. 482/54 |
| 2006/0000950 A1 | 1/2006 | Von Thal et al. |

OTHER PUBLICATIONS

International Search Report and Written Opinion for International Application No. PCT/US2011/043386, mailed Nov. 30, 2011.

\* cited by examiner

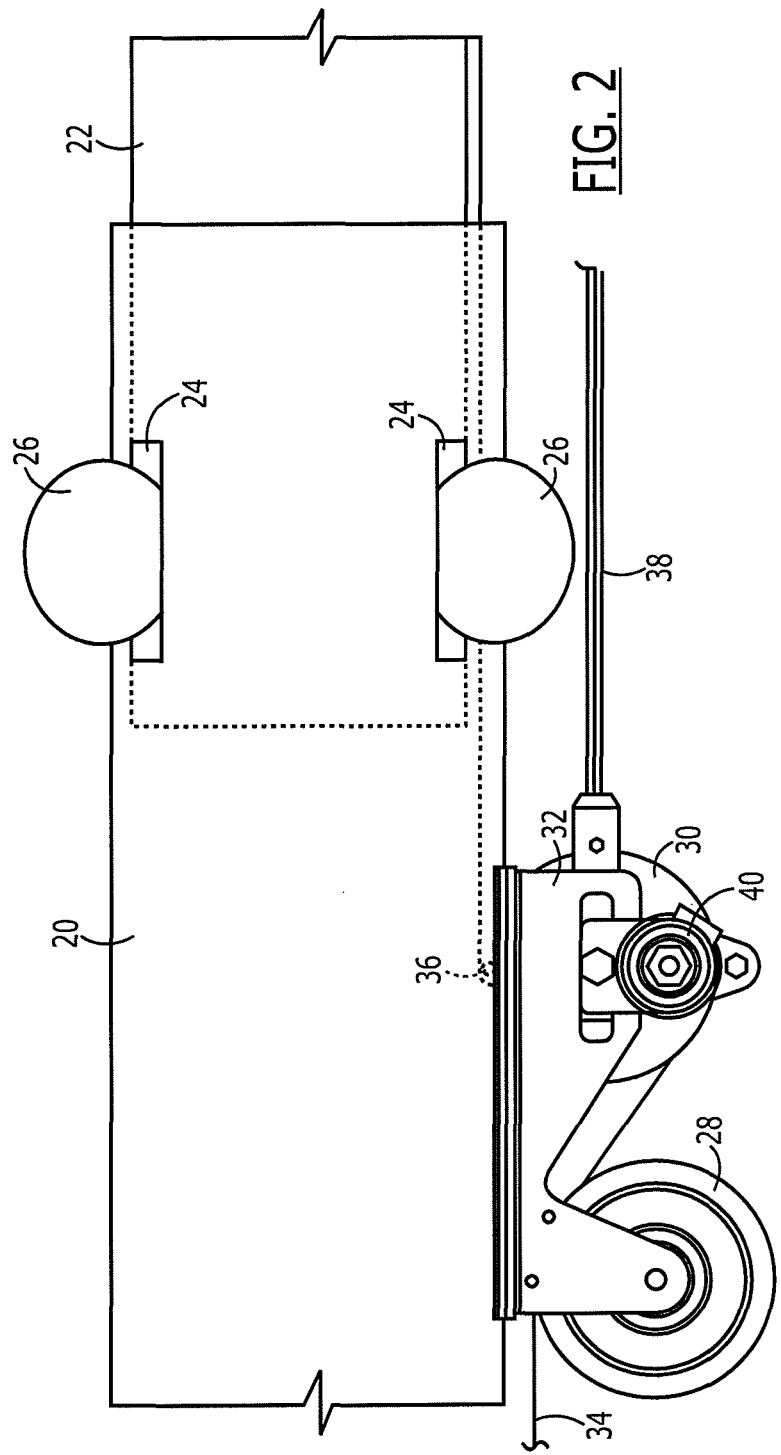

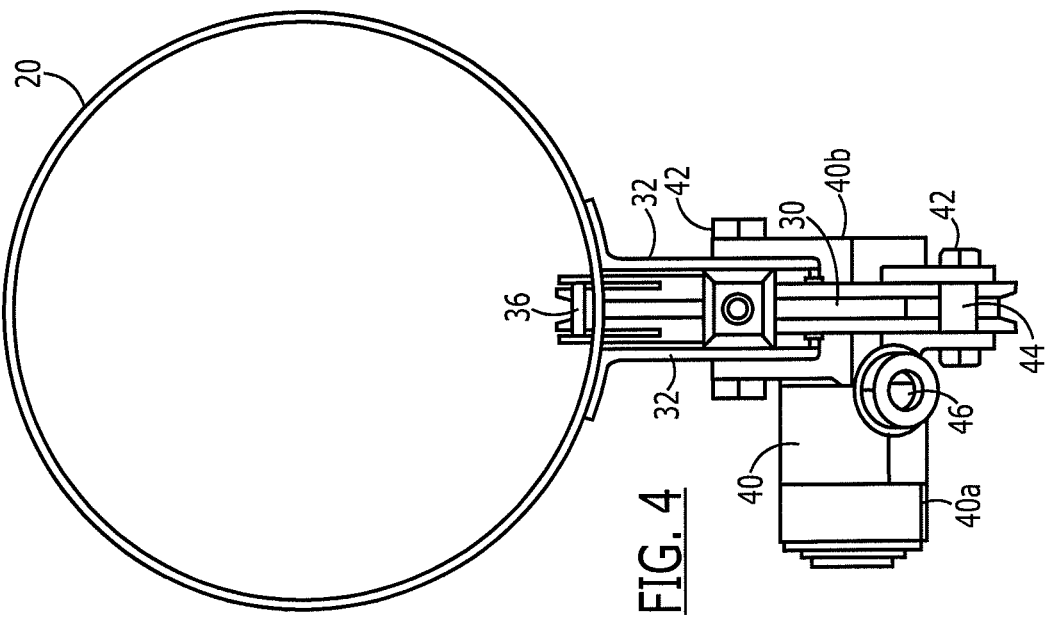
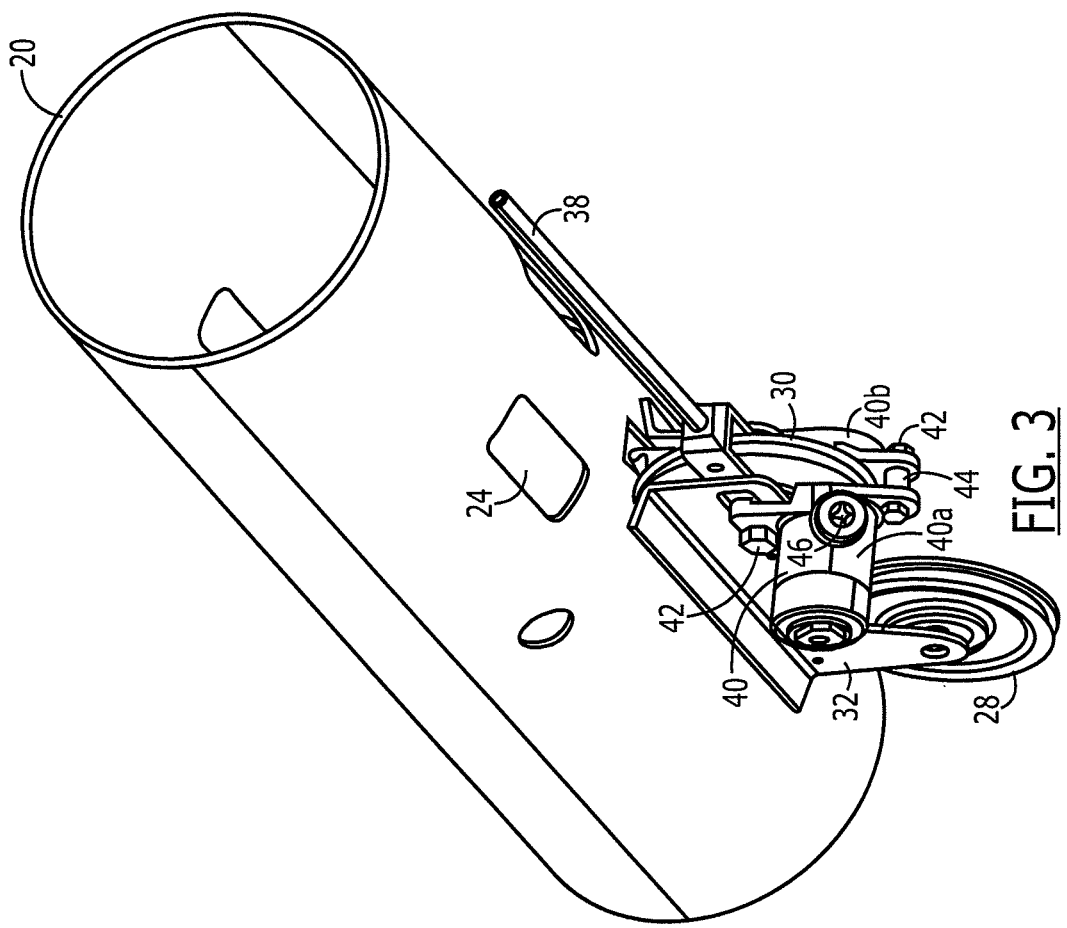

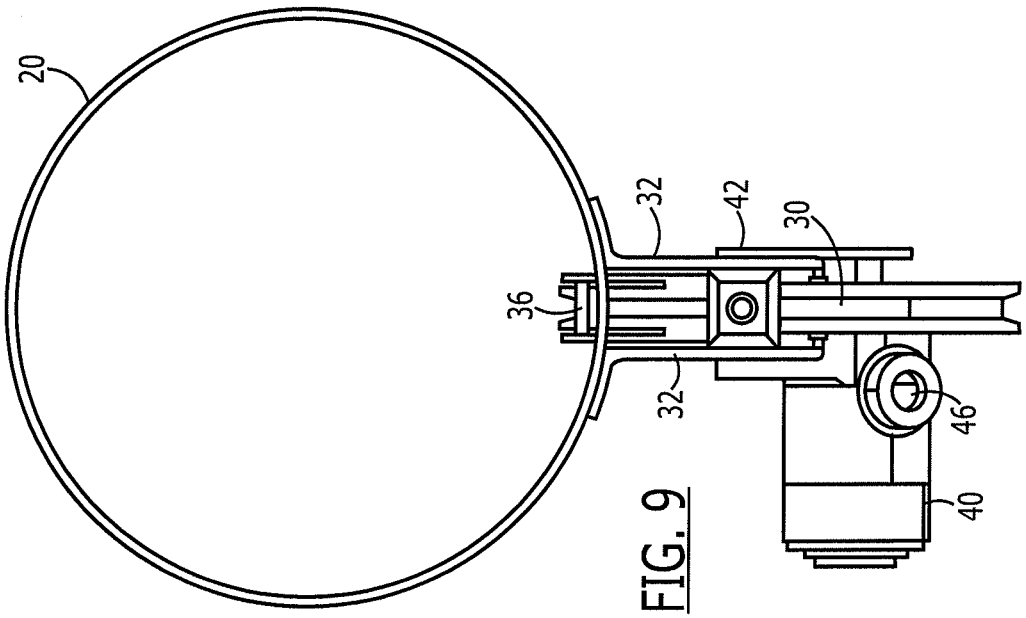
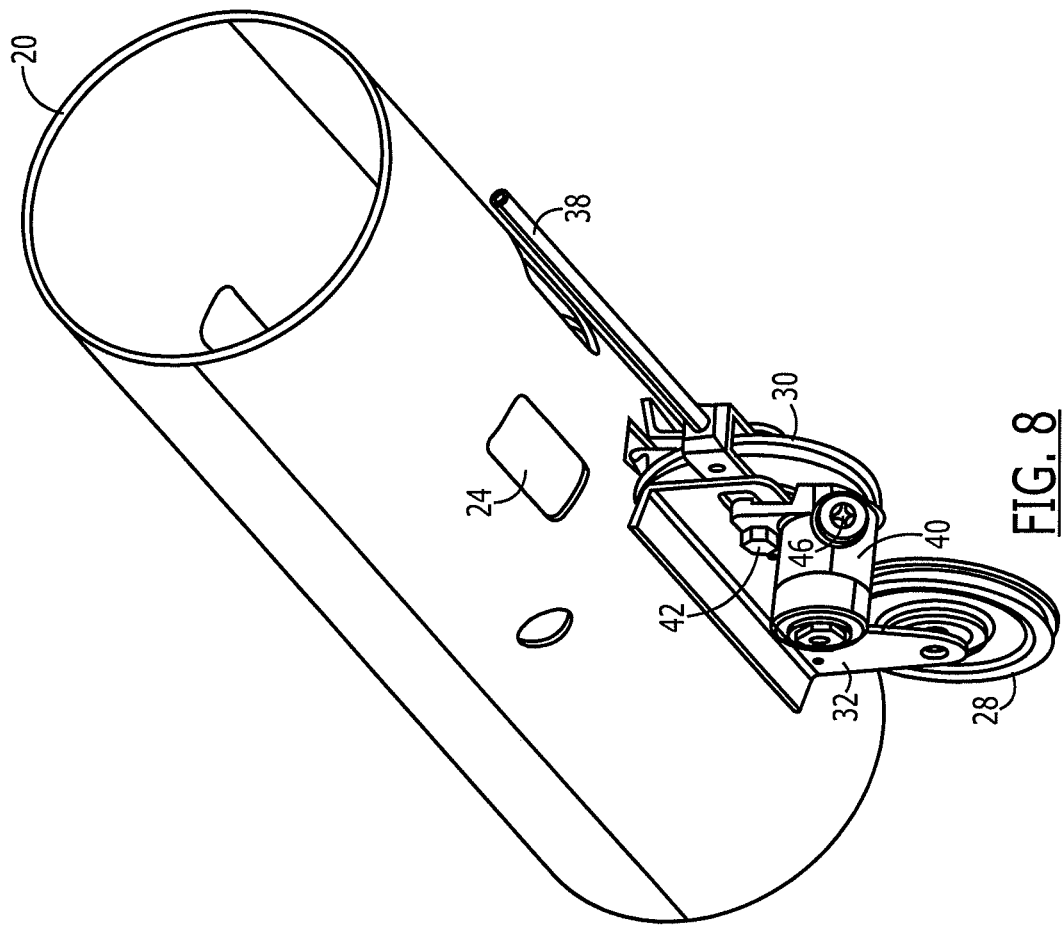

BRAKING APPARATUS AND METHOD FOR AN AERIAL REFUELING BOOM SYSTEM

TECHNOLOGICAL FILED

Embodiments of the present disclosure relate generally to an aerial refueling boom system and, more particularly, to a braking apparatus and method of an aerial refueling boom system.

BACKGROUND

During aerial refueling, a boom may be extended from a tanker aircraft. An aircraft to be refueled may position itself relative to the tanker aircraft and, more particularly, relative to the refueling boom. A connection is established between the refueling boom and the aircraft to be refueled such that fuel may be dispensed from the tanker aircraft to the aircraft to be refueled so as to effectuate the refueling operation. Following refueling, the refueling boom may be disconnected from the aircraft that was to be refueled.

The refueling boom may be retractable. As such, the boom may be extended from the tanker aircraft prior to a refueling operation and may be retracted so as to be stowed under the tanker aircraft following the refueling operation. In this regard, the refueling boom may include a plurality of tubes at least partially nested within one another so as to facilitate the extension or telescoping of the tubes in order to extend the refueling boom and the retraction of the tubes within one another in order to facilitate the retraction of the refueling boom. The extension and retraction of the refueling boom may be actuated in various manners including hydraulically and electrically. For example, an aerial refueling boom system may include a hydraulic system including a hydraulic pressure source configured to cause the refueling boom to controllably extend prior to refueling operations and to controllably retract following refueling operations. In addition, the hydraulic system may maintain the refueling boom in the retracted position when not in use.

The hydraulic system may also include a number of valves, regulators and the like for appropriately directing and applying the hydraulic pressure. For example, the hydraulic system may include a relief valve, a boom telescoping control valve and extend/retract flow control regulators. In an instance in which there is a hydraulic system anomaly, such as attributable to the hydraulic fluid or some components of the hydraulic system malfunctioning, such as a malfunction of the relief valve, the boom telescoping control valve and/or the extend/retract flow control regulators, the refueling boom may extend in an anomalous fashion. As it is desirable to control the position and operation of the refueling boom under all circumstances, such anomalous boom extensions may be disadvantageous.

BRIEF SUMMARY

A method, apparatus and system are therefore provided in order to reduce such anomalous boom extensions, even in an instance in which both the performance of the actuation source, such as a hydraulic system, is degraded, and one or more other components of the actuation system malfunction. Accordingly, the braking apparatus, method and system of embodiments of the present disclosure maintain control over a refueling boom even in the event of such malfunctions.

A braking apparatus of an aerial refueling boom system is provided in accordance with one embodiment of the present disclosure. The braking apparatus includes a pulley about which a cable wraps at least partially thereabout. The pulley is configured to be operably mounted to a first tube of the boom system and to rotate in response to movement of the second tube relative to the first tube as a result of the operable connection of the cable to the second tube. The braking apparatus also includes a lock having open and actuated positions. In the actuated position, the lock is configured to prevent rotation of the pulley and to also prevent movement of the second tube relative to the first tube. The lock is configured to be actuated by a reduction in performance of an actuation source that at least partially controls the position of the second tube relative to the first tube.

In one embodiment, the lock includes a brake having calipers on opposite sides of the pulley. The brake is configured to have the calipers in the open position to permit rotation of the pulley in an instance in which the actuation source is operational and to have the calipers in the actuated position so as to engage the pulley and to prevent further rotation of the pulley in an instance in which the performance of the actuation source is reduced. The lock of one embodiment also includes a spring configured to actuate the calipers and to move the calipers from the open position to the actuated position. The spring of this embodiment is configured to be compressed such that the calipers remain in the open position while the actuation source is operational. The spring of this embodiment is also configured to extend so as to cause the calipers to move to the actuated position and to engage the pulley in an instance in which the performance of the actuation source is reduced. In one embodiment, the actuation source comprises a hydraulic pressure source. In this embodiment, the lock may include a housing in which the spring and the calipers are disposed. The housing may further define a port for receiving hydraulic fluid from the hydraulic pressure source which compresses the spring while the hydraulic pressure source is operational and continues to provide hydraulic fluid under pressure.

In another embodiment in which the pulley defines a hole therein, the lock may include a pin configured to be maintained in the open position to permit rotation of the pulley in an instance in which the actuation source is operational and to move to the actuated position so as to extend at least partially through the hole defined by the pulley and to prevent further rotation of the pulley in an instance in which the performance of the actuation source is reduced. The lock of this embodiment may also include a spring configured to actuate the pin and to move the pin from the open position to the actuated position. The spring may be configured to be compressed such that the pin remains in the open position while the actuation source is operational. The spring may also be configured to extend so as to cause the pin to move to the actuated position and to engage the hole in the pulley in an instance in which the performance of the actuation source is reduced. In one embodiment, the actuation source comprises a hydraulic pressure source. In this embodiment, the lock may also include a housing which the spring and the pin are disposed. The housing may further define a port for receiving hydraulic fluid from the hydraulic pressure source which compresses a spring while the hydraulic pressure source is operational and continues to provide hydraulic fluid under pressure.

In another embodiment, an aerial refueling boom system may include first and second tubes with the second tube at least partially nested within the first tube. The second tube may also be configured to be actuated by an actuation source so as to move relative to the first tube. The aerial refueling boom system of this embodiment also includes a pulley about which a cable wraps at least partially thereabout. The pulley is operably mounted to the first tube and is configured to rotate in response to movement of the second tube relative to the first tube as a result of an operable connection of the cable to the second tube. The aerial refueling boom system of this embodiment also includes a lock having open and actuated positions. The lock in the actuated position is configured to prevent rotation of the pulley and to also prevent movement of the second tube relative to the first tube. The lock is configured to be actuated by a reduction in performance of the actuation source.

The lock of one embodiment may include a brake having calipers on opposite sides of the pulley. The brake of this embodiment is configured to have the calipers in an open position to permit rotation of the pulley in an instance in which the actuation source is operational and to have the calipers in an actuated position so as to engage the pulley and to prevent further rotation of the pulley in an instance in which the performance of the actuation source is reduced. The lock of this embodiment may also include a spring configured to actuate the calipers and to move the calipers from the open position to the actuated position. The spring of this embodiment is configured to be compressed such that the calipers remain in the open position while the actuation source is operational. The spring of this embodiment is also configured to extend so as to cause the calipers to move to the actuated position and to engage the pulley in an instance in which the performance of the actuation source is reduced. The actuation source may be a hydraulic pressure source. In this embodiment, the lock may also include a housing in which the spring and the calipers are disposed. The housing may further define a port for receiving hydraulic fluid from the hydraulic pressure source which compresses the spring while the hydraulic pressure source is operational and continues to provide hydraulic fluid under pressure.

In another embodiment in which the pulley defines a hole therein, the lock may include a pin configured to be maintained in the open position to permit rotation of the pulley in an instance in which the actuation source is operational and to move to the actuated position so as to extend at least partially through the hole defined by the pulley and to prevent further rotation of the pulley in an instance in which the performance of the actuation source is reduced. The lock of this embodiment may also include a spring configured to actuate the pin and to move the pin from the open position to the actuated position. The spring of this embodiment is configured to be compressed such that the pin remains in the open position while the actuation source is operational. The spring of this embodiment is also configured to extend so as to cause the pin to move to the actuated position and to engage the hole in the pulley in an instance in which the performance of the actuation source is reduced. The actuation source may include a hydraulic pressure source and the lock may include a housing in which the spring and the pin are disposed. In this embodiment, the housing may further define a port for receiving hydraulic fluid from the hydraulic pressure source which compresses the spring while the hydraulic pressure source is operational and continues to provide hydraulic fluid under pressure.

A method for controlling an aerial refueling boom system is provided in accordance with another embodiment of the present disclosure. The method includes permitting movement of a second tube of the boom system relative to a first tube in which the second tube is at least partially nested in response to actuation by an actuation source. In this regard, movement of the second tube of the boom system is permitted by permitting rotation of a pulley operably mounted to the first tube and having a cable wrapped at least partially thereabout that is operably connected to the second tube. In response to a reduction in the performance of the actuation source, the method prevents further rotation of the pulley and correspondingly prevents further movement of the second tube relative to the first tube.

In one embodiment, movement of the second tube is permitted by maintaining the calipers of a brake that are disposed on opposite sides of the pulley in an open position to permit rotation of the pulley in an instance in which the actuation source is operational. In this embodiment, further rotation of the pulley may be prevented by moving the calipers to an actuated position so as to engage the pulley in an instance in which the performance of the actuation source is reduced. The calipers of the brake may be maintained in the open position by compressing a spring of the brake while the actuation source is operational. Additionally, the calipers may be moved to the actuated position by permitting the spring to extend so as to cause the calipers to engage the pulley in an instance in which the performance of the actuation source is reduced. In one embodiment, the actuation source is a hydraulic pressure source. As such, the spring of the brake may be compressed by compressing the spring with hydraulic fluid from the hydraulic pressure source while the hydraulic pressure source is operational and continues to provide hydraulic fluid under pressure.

In another embodiment in which the pulley defines a hole therein, movement of the second tube of the boom system relative to the first tube is permitted by maintaining a pin of a brake in an open position to permit rotation of the pulley in an instance in which the actuation source is operational. In this embodiment, further rotation of the pulley is prevented by extending the pin to an actuated position in which the pin extends at least partially through the hole defined by the pulley in an instance in which the performance of the actuation source is reduced. The brake of this embodiment may also include a spring configured to actuate the pin and to move the pin from the open position to the actuated position. Thus, the pin may be maintained in an open position by compressing the spring such that the pin remains in the open position while the actuation source is operational. The pin of this embodiment may also be extended to the actuated position by permitting the spring to extend so as to cause the pin to extend and to engage the hole in the pulley in an instance in which the performance of the actuation source is reduced.

In accordance with embodiments of the braking apparatus and method, the likelihood of the anomalous extension of a refueling boom may be reduced or eliminated. However, the features, functions and advantages that have been discussed may be achieved independently in various embodiments of the present disclosure and may be combined in yet other embodiments, further details of which may be seen with reference to the following description and drawings.

BRIEF DESCRIPTION OF THE DRAWINGS

Figure 1:
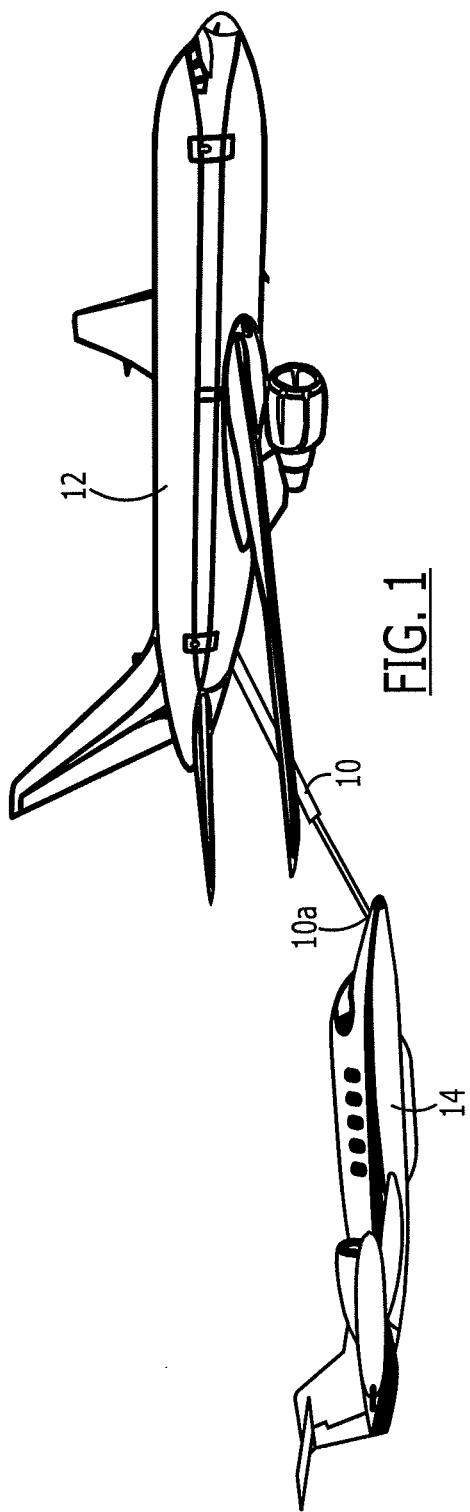
Figure 5:
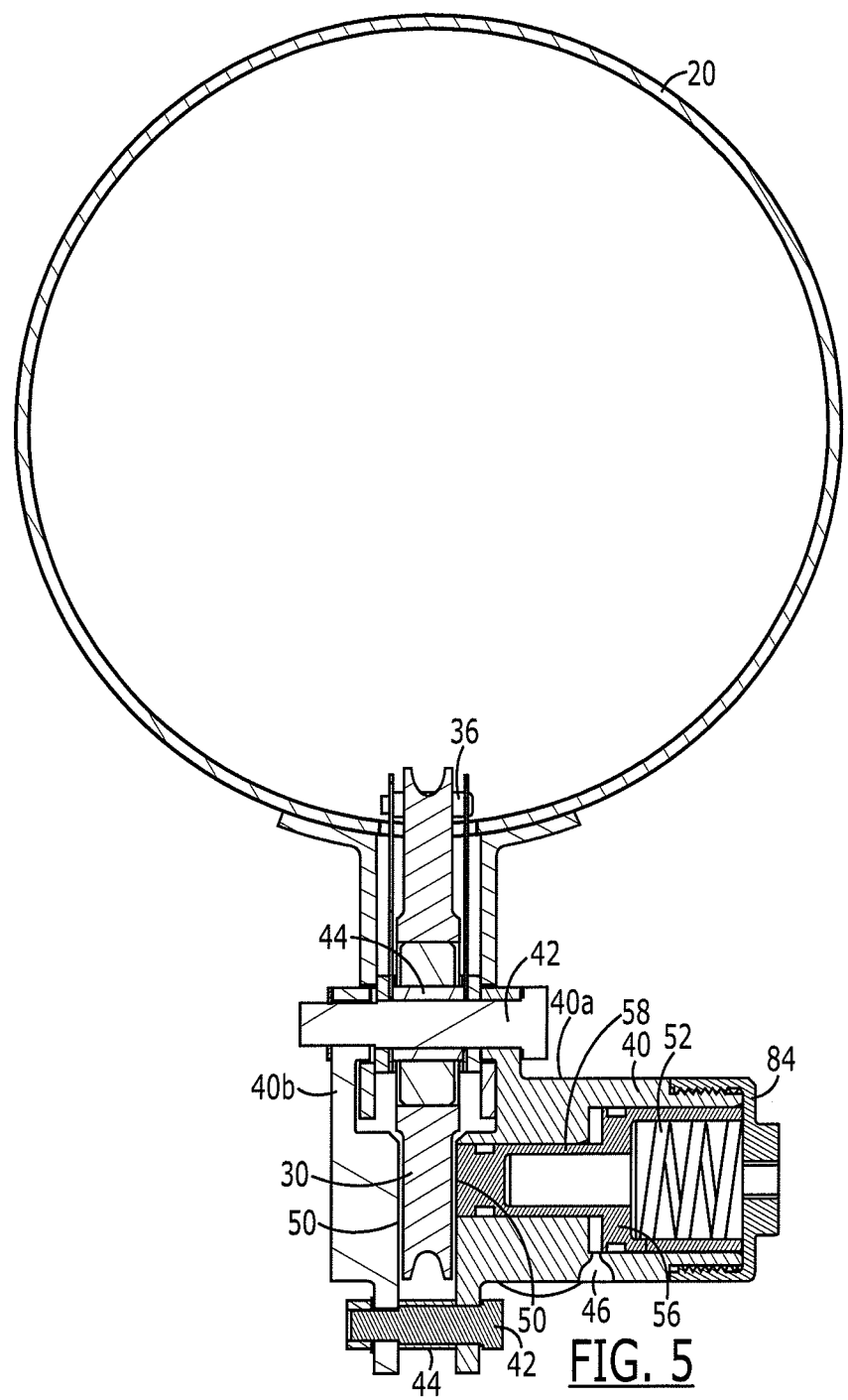
Figure 6:
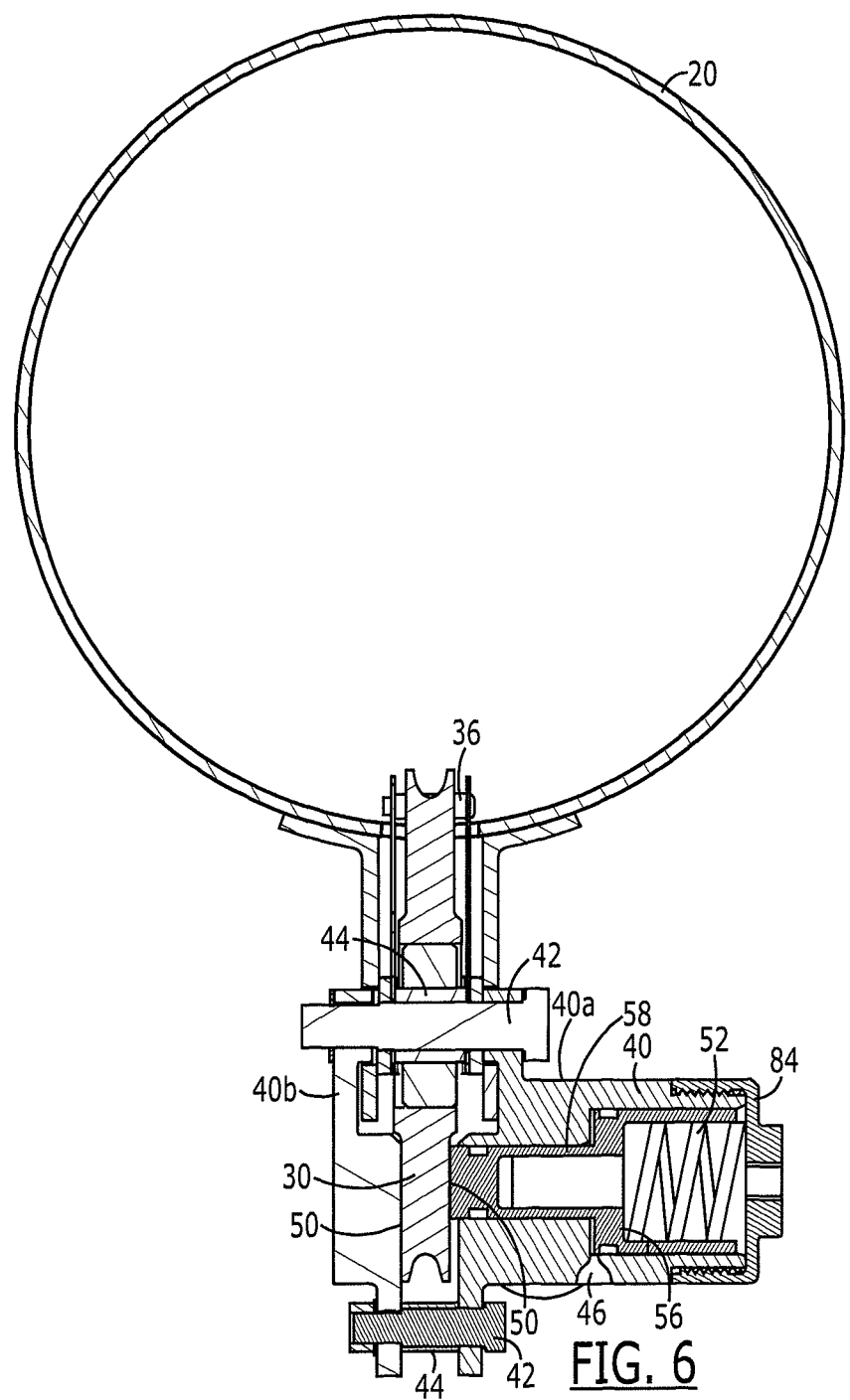
Figure 7:
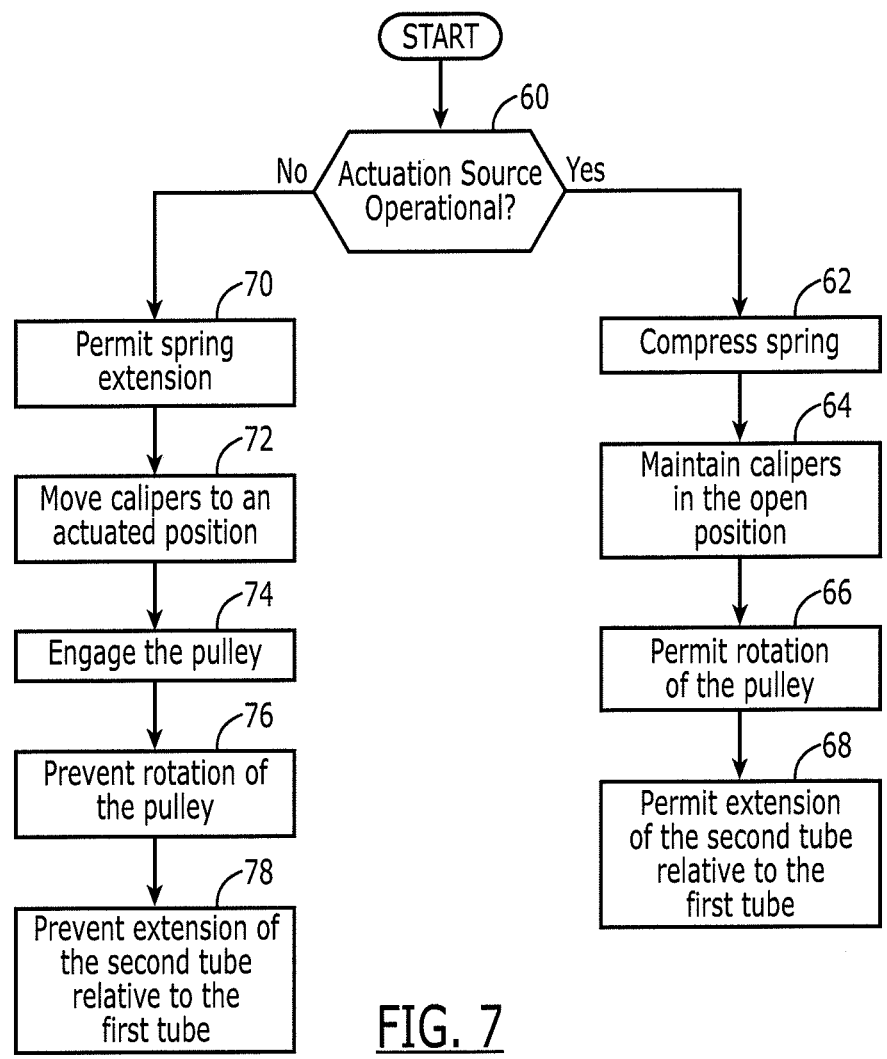
Figure 10:
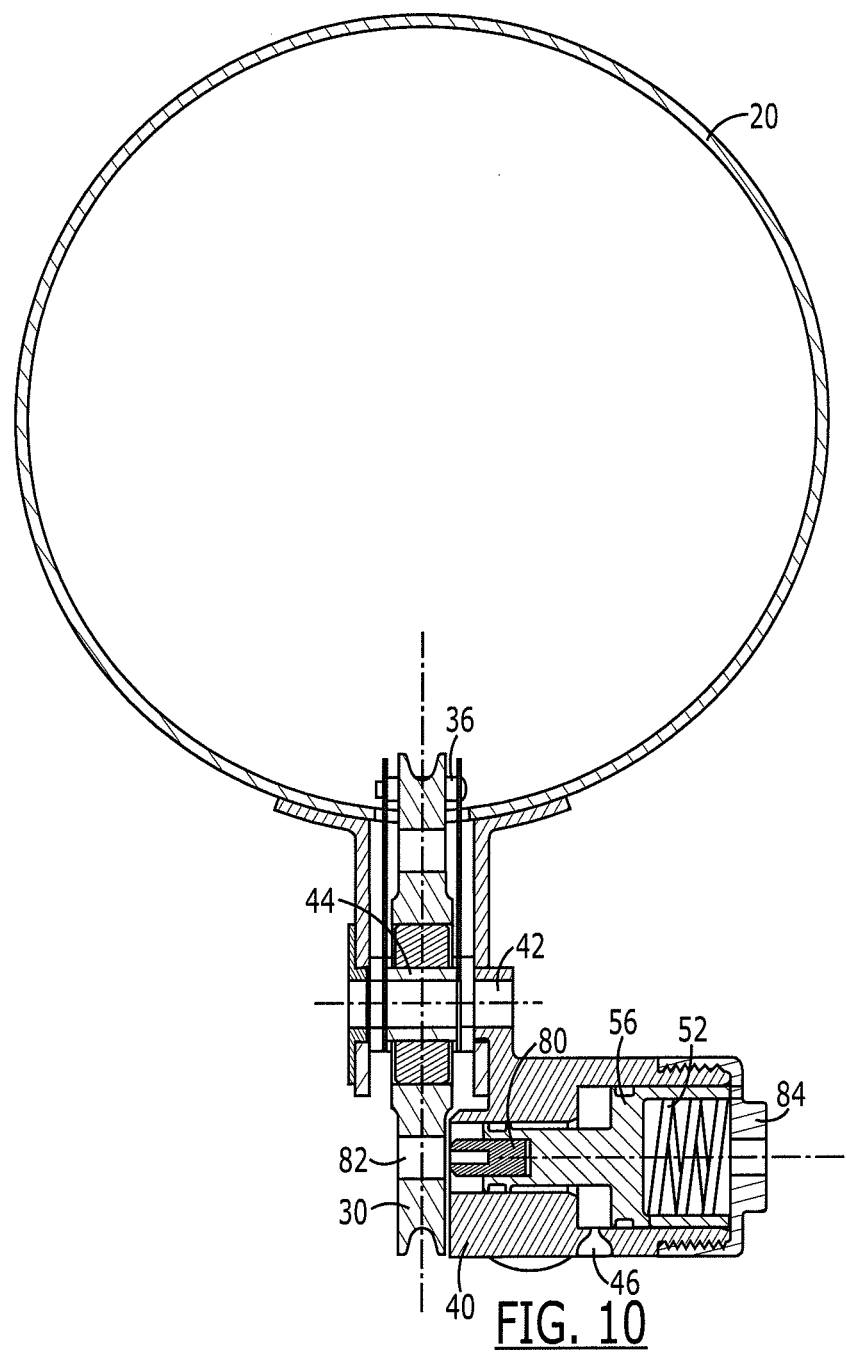
Figure 11:
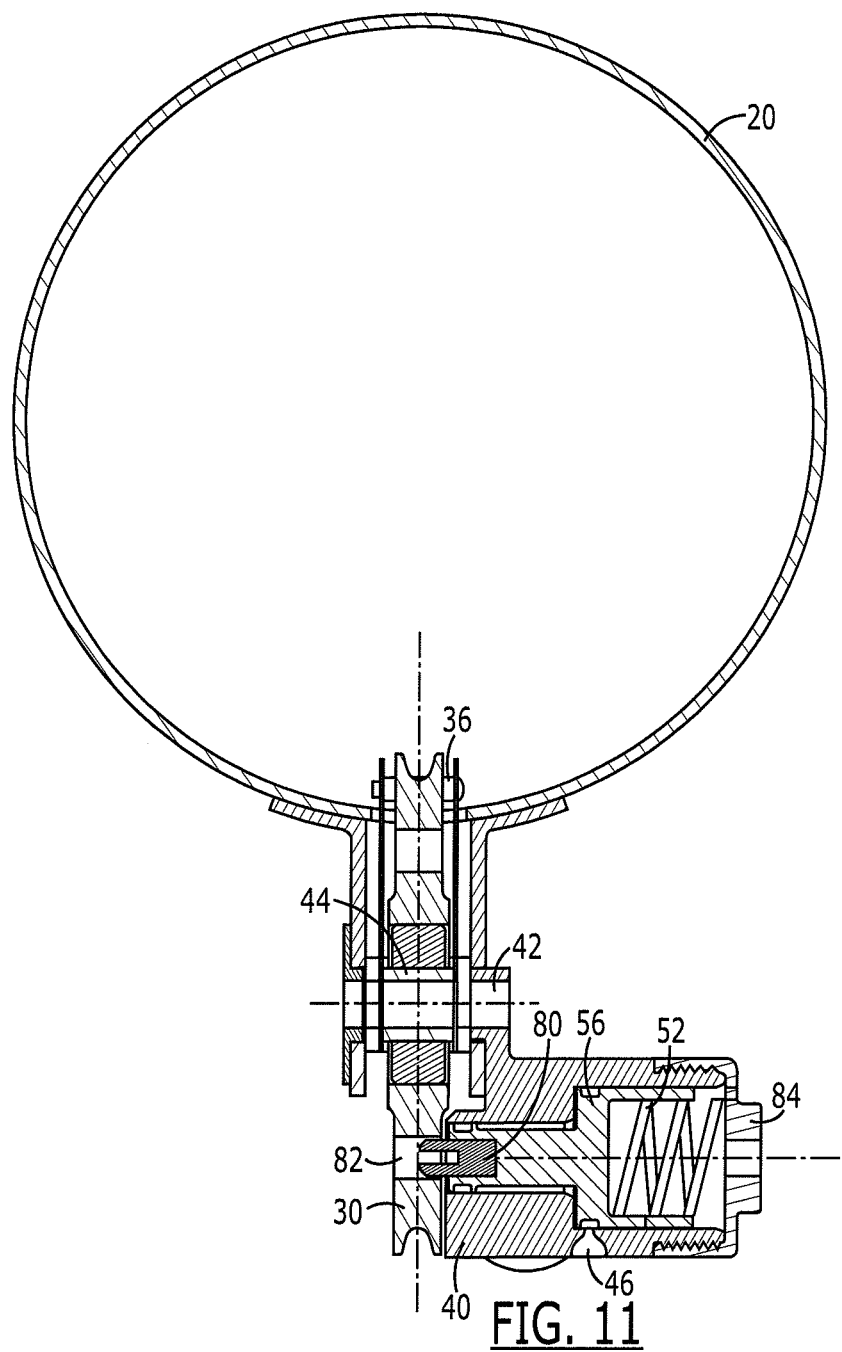
Figure 12:
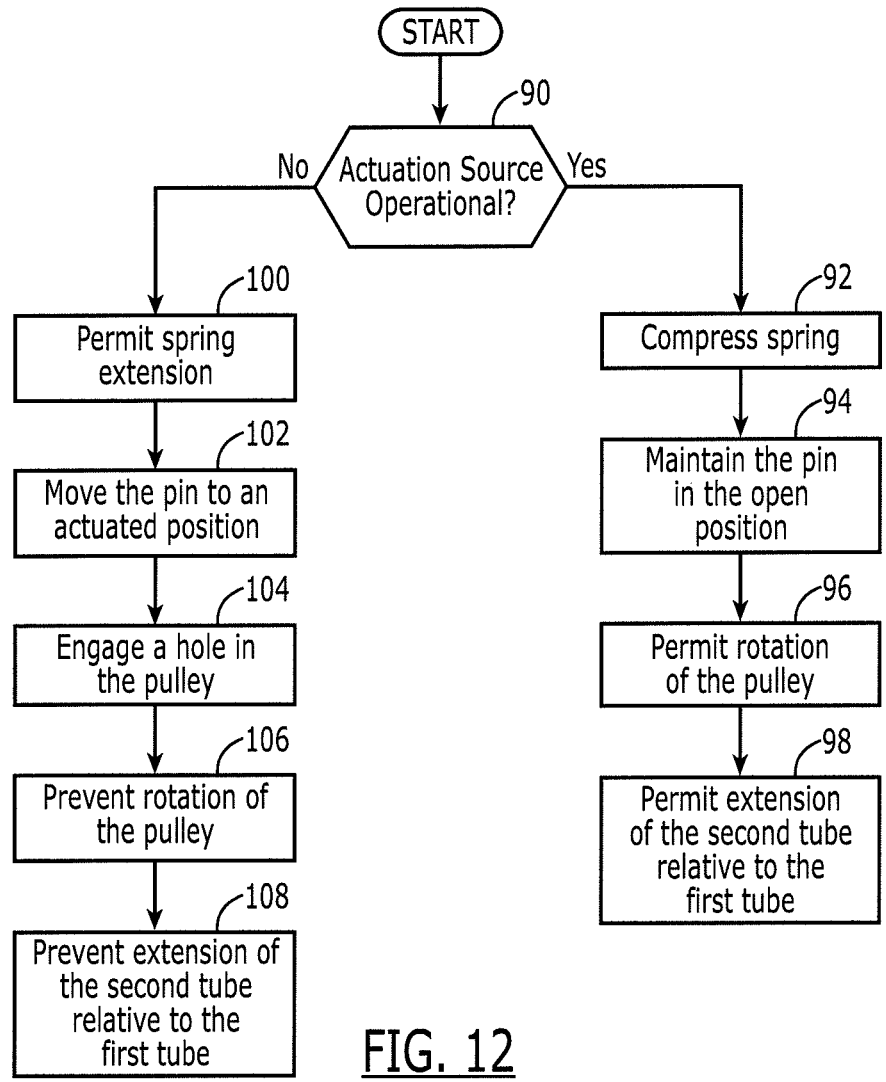

Having thus described embodiments of the present disclosure in general terms, reference will now be made to the accompanying drawings, which are not necessarily drawn to scale, and wherein:

FIG. 1 is a perspective view of an aerial refueling boom system;

FIG. 2 is a side view of an aerial refueling boom system in accordance with one embodiment of the present disclosure;

FIG. 3 is a perspective view of the aerial refueling boom system of FIG. 2 in which the second tube has been omitted for purposes of illustration;

FIG. 4 is an end view of the aerial refueling boom system of FIGS. 2 and 3 in which the second tube has been removed for purposes of illustration;

FIG. 5 is a simplified cross-sectional view of a brake and a pulley of the aerial refueling boom system of FIGS. 2-4 in which the calipers of the brake are in an open position;

FIG. 6 is a simplified cross-sectional view of a brake and a pulley of the aerial refueling boom system of FIGS. 2-4 in which the calipers of the brake are in an actuated position;

FIG. 7 is a flowchart illustrating the operations performed in accordance with a method of one embodiment of the present disclosure in which the lock comprises a brake, such as shown in FIGS. 2-6;

FIG. 8 is a perspective view of the aerial refueling boom system of another embodiment of the present disclosure in which the second tube has been omitted for purposes of illustration;

FIG. 9 is an end view of the aerial refueling boom system of FIG. 8 in which the second tube has been removed for purposes of illustration;

FIG. 10 is a simplified cross-sectional view of a pin lock and a pulley of the aerial refueling boom system of FIGS. 8 and 9 in which the pin is in an open position;

FIG. 11 is a cross-sectional view of a pin lock and a pulley of the aerial refueling boom system of FIGS. 8 and 9 in which the pin has been extended to an actuated position; and FIG. 12 is a flowchart illustrating the operations performed in accordance with another embodiment of the present disclosure in which the lock comprises a pin for engaging a hole defined by a pulley, such as shown in FIGS. 8-11.

DETAILED DESCRIPTION

Embodiments of the present disclosure now will be described more fully hereinafter with reference to the accompanying drawing, in which some, but not all embodiments are shown. Indeed, these embodiments may be embodied through many different forms and should not be construed as limited to the embodiments set forth herein; rather, these embodiments are provided so that this disclosure will satisfy applicable legal requirements. Like reference numbers refer to like elements throughout.

Referring now to FIG. 1, an aerial refueling boom system is illustrated. As shown, the aerial refueling boom system includes a refueling boom 10 having a plurality of interconnected tubes that extend generally downwardly and aft of a tanker aircraft 12. The plurality of tubes are configured to extend in a telescoping fashion relative to one another in an instance in which the refueling boom is to be extended. The refueling boom 10 of the refueling boom system includes a distal end 10a configured to be engaged by an aircraft 14 that is to receive fuel such that fuel may then be dispensed from the tanker aircraft 12 to the aircraft that has established connection with the distal end of a refueling boom. Once the aircraft 14 has been refueled, the aircraft may disconnect from the distal end 10a of the refueling boom 10 and the refueling boom may be retracted and then stowed by the tanker aircraft 12, such as under the tanker aircraft. In regards to the retraction of the refueling boom 10, the tubes may be at least partially nested within one another to facilitate the alternate retraction and extension of the refueling boom.

As shown in FIG. 2, first and second tubes 20, 22 of a refueling boom 10 are illustrated. The second tube 22 may be configured to be at least partially nested within the first tube 20, such as shown by the dashed lines in FIG. 2. The second tube 22 may be configured for lengthwise movement relative to the first tube 20. For example, the second tube 22 may be controllably extended relative to the first tube 20, such as in a direction to the right in the orientation of FIG. 2 in order to extend the aerial refueling boom 10. Conversely, the second tube 22 may be at least partially retracted within the first tube 20, such as by movement of the second tube in a direction to the left in the orientation of FIG. 2, in order to retract the aerial refueling boom 10. As shown in FIG. 2, the aerial refueling boom system may include rollers 26 or other support devices that facilitate relative movement of the second tube 22 with respect to the first tube 20. Although the rollers 26 or other support devices may be carried by the first tube 20 and/or the second tube 22, the aerial refueling boom system of one embodiment includes rollers that extend through openings 24 defined by the first tube so as to support the second tube within the first tube and to facilitate movement therebetween.

As also shown in FIG. 2, the aerial refueling boom system includes a cable 34 and a plurality of pulleys about which the cable wraps. In this regard, the cable 34 may extend over a first pulley 28 and then at least partially about a second pulley 30, such as by extending around the second pulley by more than 180° in one embodiment, prior to entering the first tube 20 and then turning about a roller 36 that is positioned within the first tube so as to then extend lengthwise through a portion of the first tube. A distal end of the cable 34 may be connected to the second tube 22, such as to a distal end of the second tube such that retraction of the cable, such as by moving the cable in a direction to the left in the orientation of FIG. 2 correspondingly causes the second tube to be retracted relative to the first tube 20. Conversely, movement of the cable 34 in the opposite direction facilitates extension of the second tube 22 relative to the first tube 20. Thus, the second pulley 30 is configured to rotate in response to movement of the second tube 22 relative to the first tube 20, as a result of the movement of the cable 34 at least partially about the second pulley. As also shown in FIG. 2, the aerial refueling boom system may include a tensioner 38 operably connected to the second pulley 30 for providing controlled movement of the second pulley relative to the first pulley 28. By appropriately positioning the second pulley 30 relative to the first pulley 28, the tensioner 38 may maintain the cable 34 in tension and avoid slack in the cable.

The first and second pulleys 28, 30 are operably mounted to the first tube 20 of the boom system. In the illustrated embodiment, for example, the aerial refueling boom system may include a bracket 32 to which the first and second pulleys 28, 30 are rotatably mounted. The bracket 32, in turn, may be connected to the first tube 20.

The aerial refueling boom system generally includes an actuation source for controlling extension and retraction of the plurality of tubes. The aerial refueling boom system may include a variety of different actuation systems, including, for example, an electrical actuation system. However, in one embodiment, the actuation system is a hydraulic actuation system having a hydraulic pressure source that is configured to controllably extend and retract the plurality of tubes.

The aerial refueling braking system includes a braking apparatus. The braking apparatus includes a lock having open and actuated positions. In the actuated position, the lock is configured to prevent rotation of the second pulley 30 and to also correspondingly prevent movement of the second tube 22 relative to the first tube 20. Conversely, in the open position, the lock is configured to permit rotation of the second pulley 30 and to correspondingly permit movement of the second tube 22 relative to the first tube 20. The lock is configured to be actuated by a reduction in performance of the actuation source. Thus, in an instance in which the actuation source malfunctions or otherwise suffers from performance degradation, the lock may be actuated. As noted above, actuation of the lock prevents rotation of the second pulley 30 and correspondingly prevents extension of the second tube 22 relative to the first tube 20, thereby preventing an anomalous extension of the refueling boom 10 even if the actuation source that is otherwise configured to control the extension and retraction of the refueling boom malfunctions. As described below, the lock may be configured in various manners including, in one embodiment, as a brake having calipers 50 for engaging the second pulley 30 and, in another embodiment, a pin 80 for controllably entering and engaging a hole 82 defined by the second pulley.

As shown in FIGS. 2-4, the lock of the illustrated embodiment includes a housing 40 that is mounted to the second pulley 30 so as to maintain a fixed position relative to the axis of rotation of the second pulley. In this regard, the housing 40 may include first and second portions 40*a*, 40*b* disposed on opposite sides of the second pulley 30. The housing 40 may also one or more connectors 42, such as bolts or other types of connectors, that connect the first and second portions 40*a*, 40*b* of the housing. One connector 42 may extend through a hole defined by the second pulley 30 that is aligned with the axis of rotation of the second pulley such that the second pulley may rotate about the connector. Another connector 42 of the illustrated embodiment may be positioned outside or beyond the second pulley 30 so as not to interfere with the rotation of the second pulley. In one embodiment, the connectors 42 may each include a sleeve 44 positioned between the first and second portions 40*a*, 40*b* of the housing so as to maintain a spacing between the first and second portions of the housing that is sufficient to facilitate rotation of the second pulley 30 without interference by the housing. As described below in conjunction with the embodiment depicted in FIGS. 8 and 9, the housing 40 may have other configurations and may be connected to the second pulley 30 in other manners. In the embodiment in which the actuation source is a hydraulic system, the housing may also define a port for 46 receiving hydraulic fluid from a hydraulic pressure source as described below.

As shown in FIG. 5, the lock of the embodiment of FIGS. 2-4 includes a brake having calipers 50 on opposite sides of the second pulley 30. In this regard, the calipers 50 may include a first caliper disposed within an internal cavity defined by the first portion 40*a* of the housing for controllably engaging one side of the second pulley 30. As shown in FIG. 5, the second portion 40*b* of the housing may serve as the second caliper for engaging the opposite side of the second pulley 30 upon actuation of the first caliper. The brake of this embodiment may be operational so as to controllably move the first caliper 50 from an open position as shown in FIG. 5 in which the calipers are spaced from the second pulley 30 and the second pulley is permitted to rotate to an actuated position as shown in FIG. 6 in which the first caliper is moved toward the second caliper such that the calipers engage opposite sides of the second pulley, thereby preventing further rotation of the second pulley and correspondingly preventing extension of the second tube 22 relative to the first tube 20. The first caliper 50 may then be returned from the actuated position to the open position in a controlled fashion if extension of the second tube 22 relative to the first tube 20 is thereafter to be permitted again.

The brake of this embodiment is configured to maintain the calipers 50 in the open position so as to permit rotation of the second pulley 30 in an instance in which the actuation source, such as the hydraulic system, is operational. Conversely, the brake is configured to maintain the calipers 50 in the actuated position so as to engage the second pulley 30 and to prevent further rotation of the second pulley in an instance in which the performance of the actuation source is reduced, such as by a degradation in the performance of the hydraulic system. As such, the engagement of the second pulley 30 by the calipers 50 and the prevention of extension of the second tube 22 relative to the first tube 20 prevent the anomalous extension of the refueling boom 10 even in an instance in which the actuation source suffers performance degradation.

As shown in FIGS. 5 and 6, the brake may also include a spring 52 positioned within a cavity defined by the housing 40, such as the first portion 40*a* of the housing. Absent the application of external forces, the spring 52 is configured to extend, thereby urging the first caliper 50 into the actuated position so as to engage the second pulley 30 between the first and second calipers. Upon compression of the spring 52, however, the first caliper 50 may be moved to the open position such that the calipers permit rotation of the second pulley 30. The spring 52 may be compressed while the actuation system is operational, but may be permitted to extend if the actuation system malfunctions. In the embodiment in which the actuation source is a hydraulic pressure source, the hydraulic pressure source may provide hydraulic fluid to the cavity defined by the housing 40, such as via the port 46 defined by the housing, so as to compress the spring 52 and maintain the calipers 50 in the open position while the hydraulic pressure source is operational and continues to provide hydraulic fluid under pressure. If the hydraulic pressure source should suffer from performance degradation, however, so as to no longer provide hydraulic fluid under pressure or at least under sufficient pressure to overcome the spring force, the spring 52 will extend and cause the first caliper 50 to move from the open position to the actuated position so as to engage the second pulley 30 and prevent rotation of the second pulley and, in turn, extension of the second tube 22 relative to the first tube 20. Thus, the brake of this embodiment prevents anomalous extension of the refueling boom 10, even in instances in which the actuation source, such as a hydraulic system, suffers meaningful performance degradation.

The spring 52 may be responsive to the actuation system in various manners, but in the illustrated embodiment, the brake employs a piston-like arrangement to facilitate compression and extension of the spring in response to the operational status of the actuation system. In the embodiment illustrated in FIGS. 5 and 6, the spring 52 may bear upon a plate 56 that is connected via a rod 58 with a caliper 50 and is moveable within the housing 40. The port 46 defined by the housing 40 opens into that portion of the cavity defined by the housing on the opposite side of the moveable plate 56 from the spring 52. In instances in which the actuation system comprises a hydraulic system that is operational, hydraulic fluid is provided under pressure via port 46 to that portion of the cavity defined by the housing on the opposite side of the moveable plate 56 from the spring. Since that portion of the cavity is fluid-tight, such as a result of an o-ring or other seal that extends peripherally about the moveable plate 56 and the rod 58 and/or caliper 50, the hydraulic fluid overcomes the spring force and compresses the spring 52, thereby pulling the first caliper 50 away from the second pulley 30 as shown in FIG. 5. In an instance in which the hydraulic system is unable to provide hydraulic fluid under sufficient pressure to overcome the spring force, the spring 52 extends, thereby moving the moveable plate 56 and the first caliper 50 until the calipers come into contact with the second pulley 30. Although the caliper 50 in the second portion 40*b* of the housing may be similarly actuated, the caliper in the second portion of the housing in the illustrated embodiment is free floating and is pressed into contact with the opposite side of the second pulley 30 as a result of a slight shift in the position of the second pulley into engagement with the caliper that is caused by the force applied by the spring-driven caliper in the first portion 40a of the housing.

Referring now to FIG. 7, the behavior of a braking apparatus of the aerial refueling boom system, such as the embodiment depicted in FIGS. 2-6 and described above, is dependent upon the operational state of the actuation source as shown at operation 60. In an instance in which the actuation source remains operational, the spring 52 is compressed and the calipers 50 are maintained in the open position. See operations 62 and 64. As such, the second pulley 30 is permitted to rotate and the second tube 22 is permitted to be extended beyond the first tube 20, if so commanded. See operations 66 and 68. Conversely, if the actuation source is no longer operational, such as by having suffered a meaningful performance degradation, the spring 52 is permitted to extend so as to move the calipers 50 to the actuated position. See operations 70 and 72. In the actuated position, the calipers 50 engage the second pulley 30 and prevent rotation of the second pulley and correspondingly prevent extension of the second tube 22 relative to the first tube 20. See operations 74, 76 and 78.

The lock may be configured in several different manners. As shown in FIGS. 8-11, for example, a lock of another embodiment includes a pin lock in lieu of the brake described above. In this embodiment, the lock may again include a housing 40 mounted in a fixed position relative to the axis of rotation of the second pulley 30. In this regard, the housing may include a connector 42 extending through a hole defined by the second pulley and aligned with the axis of rotation of the second pulley. As a result of its abutment with the bracket 32, the combination of the connector 42 and the positional relationship of the housing 40 to the bracket maintains the housing in a fixed position relative to the second pulley 30. While the housing of this embodiment could also include first and second portions disposed on opposite sides of the second pulley 30, the housing 40 of this embodiment is shown to be positioned on one side of the second pulley with only a nut or other engagement member for engaging the connector on the opposite side of the second pulley.

As described above, the housing 40 defines an internal cavity in which the pin 80 may be at least partially disposed. The lock of this embodiment may be configured to permit the pin 80 to move between an open, i.e., retracted, position as shown in FIG. 10 in which the pin is withdrawn within the cavity defined by the housing 40 and so as not engage the second pulley 30 to an actuated, i.e., extended, position as shown in FIG. 11 in which the pin extends at least partially beyond the housing so as to engage and at least partially extend it through a hole 82 defined by the second pulley 30. As such, engagement of the pin 80 with the hole 82 defined by the second pulley 30 prevents further rotation of the second pulley and, correspondingly, prevents any extension of the second tube 22 relative to the first tube 20.

The lock of this embodiment may also include a spring 52 configured to actuate the pin 80. The spring 52 is configured to move the pin 80 from the open position to the actuated position. In the absence of external forces, the spring 52 is extended such that the pin 80 is correspondingly in the actuated position as shown in FIG. 11, thereby engaging and preventing rotation of the second pulley 30. Upon the application of external forces, however, the spring 52 may be compressed so as to move the pin 80 to the open position as shown in FIG. 10, thereby permitting the second pulley 30 to rotate.

In the illustrated embodiment, the lock is configured such that the pin 80 is in the open position to permit rotation of the second pulley 30 in an instance in which the actuation source is operational. Conversely, the pin 80 of the illustrated embodiment is extended to the actuated position so as to extend at least partially through the hole 82 defined by the second pulley 30 and to prevent further rotation of the second pulley in an instance in which the actuation source suffers from performance degradation.

The spring 52 may be responsive to the actuation system in various manners, but in the illustrated embodiment, the lock employs a piston-like arrangement to facilitate compression and extension of the spring in response to the operational status of the actuation system. In the embodiment illustrated in FIGS. 10 and 11, the spring 52 may bear upon a plate 56 from which the pin 80 extends. The plate 56, as well as the pin 80 that extends therefrom, is moveable within the housing 40. The port 46 defined by the housing 40 opens into that portion of the cavity defined by the housing on the opposite side of the moveable plate 56 from the spring 52. In instances in which the actuation system comprises a hydraulic system that is operational, hydraulic fluid is provided under pressure via port 46 to that portion of the cavity defined by the housing on the opposite side of the moveable plate 56 from the spring 52. Since that portion of the cavity is fluid-tight, such as a result of an o-ring or other seal that extends peripherally about the moveable plate 56 and the pin 80, the hydraulic fluid overcomes the spring force and compresses the spring 52, thereby retracting the pin 80 away from the second pulley 30 as shown in FIG. 10. In an instance in which the hydraulic system is unable to provide hydraulic fluid under sufficient pressure to overcome the spring force, the spring 52 extends, thereby moving the moveable plate 56 and the pin 80 with the pin entering the hole 82 defined by the second pulley 30, thereby preventing rotation of the second pulley and correspondingly preventing extension of the second tube 22 relative to the first tube 20.

As shown in FIG. 12, the behavior of a braking apparatus of the aerial refueling boom system, such as the embodiment depicted in FIGS. 8-11 and described above, is dependent upon the operational state of the actuation source as shown at operation 90. In an instance in which the actuation source remains operational, the spring 52 is compressed and the pin 80 is maintained in the open position. See operations 92 and 94. As such, the second pulley 30 is permitted to rotate and the second tube 22 is permitted to be extended beyond the first tube 20, if so commanded. See operations 96 and 98. Conversely, if the actuation source is no longer operational, such as by having suffered a meaningful performance degradation, the spring 52 is permitted to extend so as to extend the pin 50 to the actuated position. See operations 100 and 102. In the actuated position, the pin 80 engages the second pulley 30, such as by entering and engaging a hole 82 defined by the second pulley, and prevents rotation of the second pulley and correspondingly prevents extension of the second tube 22 relative to the first tube 20. See operations 104, 106 and 108.

The braking apparatus may also include a mechanism for adjusting the force with which the lock engages the second pulley 30. As shown in FIGS. 5, 6, 10 and 11, the housing 40 may include an adjustment mechanism, such as an adjustment cap 84. The adjustment cap 84 may be threadably connected to the remainder of the housing 40b so as to operably support one end of the spring 52, thereby retaining the spring between the adjustment cap and the moveable plate 56. By further threading the adjustment cap 84 into the housing 40, the spring 52 may be further compressed, such that the extension of the spring upon the performance degradation of the actuation source applies greater braking force to the second pulley 30, such as by means of the calipers 50. Conversely, threading the adjustment cap 84 so as to loosen the adjustment cap relative to the housing causes the spring to apply a smaller braking force to the second pulley 30, such as by means of the calipers 50, in instances in which the actuation source suffers from performance degradation. The adjustment cap 84 may be manipulated in various manners including, for example, by means of a hex protrusion or a square hole drive. Once appropriately positioned, the adjustment cap 84 may be fixed in position, such as by means of a safety wire which will prevent further rotation until the safety wire is removed.

Many modifications and other embodiments of the disclosure set forth herein will come to mind to one skilled in the art to which these embodiments pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A braking apparatus of an aerial refueling boom system, the braking apparatus comprising:
    a pulley about which a cable wraps at least partially thereabout, wherein the pulley is configured to be operably mounted to and carried by a first tube of the boom system and to rotate in response to movement of a second tube relative to the first tube as a result of an operable connection of the cable to the second tube; and
    a lock having open and actuated positions and also operably mounted to and carried by the first tube of the boom system, wherein the lock in the actuated position is configured to engage the pulley so as to prevent rotation of the pulley and to also prevent extension of the second tube relative to the first tube, and wherein the lock is configured to be actuated by a reduction in performance attributable to a malfunction of an actuation source that at least partially controls a position of the second tube relative to the first tube,
    wherein the lock comprises a brake having calipers on opposite sides of the pulley, and wherein the brake is configured to have the calipers in the open position to permit rotation of the pulley in an instance in which the actuation source is operational and to have the calipers in the actuated position so as to engage the pulley and to prevent further rotation of the pulley in an instance in which the performance of the actuation source is reduced as a result of the malfunction of the actuation source.

2. A braking apparatus of claim 1 wherein the lock further comprises a spring configured to actuate the calipers and to move the calipers from the open position to the actuated position, wherein the spring is configured to be compressed such that the calipers remain in the open position while the actuation source is operational, and wherein the spring is configured to extend so as to cause the calipers to move to the actuated position and to engage the pulley in an instance in which the performance of the actuation source is reduced.

3. A braking apparatus of claim 2 wherein the actuation source comprises a hydraulic pressure source, wherein the lock further comprises a housing in which the spring and the calipers are disposed, and wherein the housing further defines a port for receiving hydraulic fluid from the hydraulic pressure source which compresses the spring while the hydraulic pressure source is operational and continues to provide hydraulic fluid under pressure.

4. An aerial refueling boom system comprising:
    first and second tubes, wherein the second tube is at least partially nested within the first tube, and wherein the second tube is also configured to be actuated by an actuation source so as to move relative to the first tube;
    a pulley about which a cable wraps at least partially thereabout, wherein the pulley is operably mounted to and carried by the first tube and configured to rotate in response to movement of the second tube relative to the first tube as a result of an operable connection of the cable to the second tube; and
    a lock having open and actuated positions and also operably mounted to and carried by the first tube of the boom system, wherein the lock in the actuated position is configured to engage the pulley so as to prevent rotation of the pulley and to also prevent extension of the second tube relative to the first tube, and wherein the lock is configured to be actuated by a reduction in performance attributable to a malfunction of the actuation source,
    wherein the lock comprises a brake having calipers on opposite sides of the pulley, and wherein the brake is configured to have the calipers in the open position to permit rotation of the pulley in an instance in which the actuation source is operational and to have the calipers in the actuated position so as to engage the pulley and to prevent further rotation of the pulley in an instance in which the performance of the actuation source is reduced as a result of the malfunction of the actuation source.

5. An aerial refueling boom system of claim 4 wherein the lock further comprises a spring configured to actuate the calipers and to move the calipers from the open position to the actuated position, wherein the spring is configured to be compressed such that the calipers remain in the open position while the actuation source is operational, and wherein the spring is configured to extend so as to cause the calipers to move to the actuated position and to engage the pulley in an instance in which the performance of the actuation source is reduced.

6. An aerial refueling boom system of claim 5 wherein the actuation source comprises a hydraulic pressure source, wherein the lock further comprises a housing in which the spring and the calipers are disposed, and wherein the housing further defines a port for receiving hydraulic fluid from the hydraulic pressure source which compresses the spring while the hydraulic pressure source is operational and continues to provide hydraulic fluid under pressure.

* * * * *